US009631565B2

(12) United States Patent
Lee

(10) Patent No.: US 9,631,565 B2
(45) Date of Patent: Apr. 25, 2017

(54) CONTROL METHOD FOR IMPROVING NITROGEN OXIDE PURIFICATION PERFORMANCE

(71) Applicant: HYUNDAI MOTOR COMPANY, Seoul (KR)

(72) Inventor: Hyo Kyung Lee, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 16 days.

(21) Appl. No.: 14/949,864

(22) Filed: Nov. 23, 2015

(65) Prior Publication Data

US 2017/0074190 A1    Mar. 16, 2017

(30) Foreign Application Priority Data

Sep. 15, 2015  (KR) .................. 10-2015-0130530

(51) Int. Cl.
*F01N 3/20* (2006.01)
*F02D 41/02* (2006.01)
(Continued)

(52) U.S. Cl.
CPC ......... *F02D 41/0275* (2013.01); *F01N 3/021* (2013.01); *F01N 3/2066* (2013.01);
(Continued)

(58) Field of Classification Search
CPC .... F01N 3/0814; F01N 3/0842; F01N 3/0871; F01N 3/0885; F01N 2250/12; F01N 2430/06; F01N 2560/025; F01N 2560/14; F01N 2570/14; F01N 2900/0422; F01N 2900/08; F01N 2900/1402; F01N 2900/1602; F01N 2900/1614; Y02T 10/47
(Continued)

(56) References Cited

U.S. PATENT DOCUMENTS

2002/0189237 A1* 12/2002 Bidner .................. F01N 11/007
60/277

FOREIGN PATENT DOCUMENTS

JP    2006-512529 A    4/2006
JP    2007-040280 A    2/2007
(Continued)

OTHER PUBLICATIONS

Korean Office Action dated Sep. 26, 2016 issued in Korean Patent Application No. 10-2015-0130530.

*Primary Examiner* — Jorge Leon, Jr.
(74) *Attorney, Agent, or Firm* — McDermott Will & Emery LLP

(57) ABSTRACT

A control method for improving nitrogen oxide purification performance ($NO_x$) includes starting $NO_x$ regeneration, comparing first and second lambda values measured at first and second lambda sensors in a control unit, checking the lean $NO_x$ trap (LNT) temperature, and measuring a second time that has elapsed after the first and second lambda values are found to be the same, and checking whether the second time is greater than or equal to a predetermined time when it is observed that the temperature of the LNT is greater than or equal to the predetermined temperature value.

13 Claims, 4 Drawing Sheets

(51) Int. Cl.
  *F01N 9/00* (2006.01)
  *F01N 3/021* (2006.01)
  *F01N 3/08* (2006.01)

(52) U.S. Cl.
  CPC .............. *F01N 9/00* (2013.01); *F01N 3/0814* (2013.01); *F01N 3/0842* (2013.01); *F01N 3/0871* (2013.01); *F01N 3/0885* (2013.01); *F01N 2250/02* (2013.01); *F01N 2250/12* (2013.01); *F01N 2430/06* (2013.01); *F01N 2560/025* (2013.01); *F01N 2560/14* (2013.01); *F01N 2570/14* (2013.01); *F01N 2900/0416* (2013.01); *F01N 2900/0422* (2013.01); *F01N 2900/08* (2013.01); *F01N 2900/1402* (2013.01); *F01N 2900/1602* (2013.01); *F01N 2900/1614* (2013.01); *Y02T 10/47* (2013.01)

(58) Field of Classification Search
  USPC ................................... 60/274, 285, 295, 301
  See application file for complete search history.

(56) References Cited

FOREIGN PATENT DOCUMENTS

| | | |
|---|---|---|
| JP | 2009-275631 A | 11/2009 |
| JP | 2010-112345 A | 5/2010 |
| JP | 2012-237296 A | 12/2012 |
| KR | 10-2010-0097742 A | 9/2010 |
| KR | 10-2015-0071297 A | 6/2015 |
| WO | 2004/061278 A1 | 7/2004 |
| WO | 2009/080152 A1 | 7/2009 |

\* cited by examiner

CONTROL METHOD FOR IMPROVING NITROGEN OXIDE PURIFICATION PERFORMANCE

CROSS-REFERENCE TO RELATED APPLICATION

This application claims the benefit of priority to Korean Patent Application No. 10-2015-0130530, filed on Sep. 15, 2015 in the Korean Intellectual Property Office, the entirety of which is incorporated herein by reference.

TECHNICAL FIELD

The present disclosure relates to a control method for improving nitrogen oxide ($NO_x$) purification performance. This control method is capable of improving the purification of nitrogen oxides ($NO_x$), which are generated while a vehicle engine is running, so as to prevent the nitrogen oxides ($NO_x$) from being discharged outward.

BACKGROUND

Lean-burn engines have been widely used to improve vehicle fuel economy. As exhaust emission regulations have become more stringent, a lean nitrogen oxide trap (LNT) is typically mounted onto the rear end of an exhaust manifold, and a diesel particulate filter (DPF) is mounted onto the rear end of the LNT in vehicles in which a lean-burn engine is mounted so as to reduce the quantity of toxic exhaust gases emitted from the engine.

The LNT serves to trap and store nitrogen oxides ($NO_x$) generated due to lean burning in the engine, reduce the $NO_x$ into nitrogen ($N_2$) by means of a reduction reaction, and then discharge the nitrogen ($N_2$). Such an LNT may be subjected to sulfur poisoning, which occurs due to sulfur components included in fuel and engine oil, and thus the ability to trap $NO_x$ may be deteriorated. In such cases, the $NO_x$ purification performance must be restored through desulfurization.

Candidate systems used to solve the above problems include LNTs and passive selective catalytic reduction (pSCR) systems. The LNTs and pSCR systems serve to store $NO_x$ in an LNT in a general driving mode, in which oxygen is plentiful. When $NO_x$ is present in an amount greater than a predetermined amount, the driving mode is converted to an enriched mode, in which the fuel in an engine is enriched and $NO_x$ stored in the LNT is converted into harmless $N_2$, which is then removed. In this case, some of the $NO_x$ stored in the LNT is converted into $NH_3$ at the LNT, and the $NH_3$ is stored in an SCR unit, located downstream of the LNT. Then, once the driving mode is converted from the enriched mode back to a general driving mode, in which oxygen is plentiful, $NH_3$ reacts with $NO_x$ that slipped through the LNT to generate $N_2$ which is then removed.

The removal of $NO_x$ from the LNT takes place as follows: $NO+CO \rightarrow CO_2+\frac{1}{2}N_2$, where one molecule of $NO_x$ is removed. The removal of $NO_x$ from a pSCR unit takes place as follows: $NO+5/2H_2 \rightarrow NH_3+H_2O$ and $NH_3+NO+WO_2 \rightarrow N_2+3/2H_2O$, where two molecules of $NO_x$ are removed.

In the prior art, an enriched mode for purifying stored $NO_x$ is terminated when values measured at lambda sensors installed at the front/rear ends of the LNT are identical to each other. The lambda value measured at the rear lambda sensor is maintained high as oxygen and $NO_x$ present in the LNT are detached, but becomes identical to a lambda value measured at the front lambda sensor when these chemical species are completely consumed in the LNT. In this case, it is judged that the regeneration of $NO_x$ in the LNT is complete.

However, since the lambda sensors are highly affected by $O_2$ detachment, $NO_x$ may remain in the LNT even after termination of the enriched mode when the lambda sensors are applied to conventional control systems. Such residual $NO_x$ may be converted into $NH_3$, and $NH_3$ generation may be activated since no oxygen is present in a subsequent enriched mode. Therefore, it is necessary to minimize residual $NO_x$ in order to improve the performance of the LNT and the pSCR unit. Accordingly, there is a need for a control method for improving $NO_x$ purification performance capable of increasing the quantity of $O_2$ that is emitted without installing additional equipment, and capable of minimizing residual $NO_x$ and increasing $NH_3$ generation by delaying the point in time at which lambda values measured at the front/rear lambda sensors are found to be the same so as to delay the time at which $NO_x$ is regenerated in an enriched mode.

The contents described in the prior art are merely illustrated to aid in understanding the background of the present disclosure, and thus it should be understood that the contents are not deemed to fall within the prior art already known by those skilled in the related art.

SUMMARY

Therefore, the present disclosure has been made in view of the above problems, and it is an object of the present disclosure to provide a control method for improving $NO_x$ purification performance capable of increasing the quantity of $O_2$ that is emitted without installing additional equipment, and capable of minimizing residual $NO_x$ and increasing $NH_3$ generation by delaying the point of time at which lambda values measured at the front/rear lambda sensors are found to be the same so as to delay the point of time at which $NO_x$ is regenerated in an enriched mode.

The technical objects of the present invention are not limited to the aforesaid, and other technical objects not described herein will be clearly understood by those skilled in the art from the detailed description below.

According to an aspect of the present disclosure, the above and other objects can be accomplished by the provision of a control method for improving nitrogen oxide purification performance, which includes introducing $NO_x$ into a regeneration process to regenerate $NO_x$ at a control unit, converting from a general driving mode to an enriched mode in which a relative quantity of fuel in an engine is increased, and checking whether the enriched mode is maintained for a time, which is measured after conversion into the enriched mode, greater than a minimum holding time ($NO_x$ regeneration start step), comparing lambda values measured at first and second lambda sensors in the control unit when it is observed that the enriched mode is maintained for a time greater than the minimum holding time after conversion into the enriched mode in the $NO_x$ regeneration start step (lambda value comparison step), checking whether the temperature of a lean $NO_x$ trap (LMT) is greater than or equal to a predetermined temperature value, input in advance into the control unit, when the lambda value measured at the first lambda sensor is greater than or equal to the lambda value measured at the second lambda sensor in the lambda value comparison step (LNT temperature checking step), and finding the lambda values measured at the first and second lambda sensors to be the same, measuring a time that has elapsed after the lambda values are found to be the same, and checking whether the measured time is greater than or equal to an optimum time stored in advance in the control unit when it is observed that the temperature of the LNT is greater than or equal to the predetermined temperature value in the LNT temperature checking step (lambda value equalization step).

Here, the $NO_x$ regeneration start step may further include determining whether the engine has been started and whether the quantity of $NO_x$ stored in the LNT is greater than or equal to a reference value stored in advance in the control unit ($NO_x$ storage determination step).

The $NO_x$ regeneration start step may further include judging whether $NO_x$ regeneration should commence based on predetermined references, input in advance into the control unit ($NO_x$ regeneration commencement judgment step).

The $NO_x$ regeneration commencement judgment step may include checking whether the engine RPM falls within a predetermined reference range, input in advance into the control unit.

The $NO_x$ regeneration commencement judgment step may include checking whether the quantity of fuel falls within a predetermined reference range, input in advance into the control unit.

The $NO_x$ regeneration commencement judgment step may include checking whether the temperature of the LNT is greater than or equal to a predetermined reference value, input in advance into the control unit.

The $NO_x$ regeneration start step may include repeatedly measuring the time since conversion to the enriched mode when it is observed that the enriched mode is maintained for a time, which is measured at the control unit after conversion into the enriched mode, less than the minimum holding time input in advance into the control unit.

The lambda value comparison step may include repeatedly checking whether the enriched mode is maintained for a time, which is measured after conversion into the enriched mode, greater than the minimum holding time when the lambda value measured at the first lambda sensor is less than the lambda value measured at the second lambda sensor.

The LNT temperature checking step may include terminating the enriched mode in which $NO_x$ is regenerated (termination step) when it is observed that the temperature of the LNT is less than the predetermined temperature value.

The lambda value equalization step may include measuring the time after the lambda values measured at the first and second lambda sensors are found to be the same, and terminating the enriched mode in which $NO_x$ is regenerated (termination step) when the measured time is greater than or equal to an optimum time stored in advance in the control unit.

The termination step may further include terminating the enriched mode in which $NO_x$ is regenerated at the control unit and setting the quantity of $NO_x$ stored in the LNT to 0 (resetting step), after which the $NO_x$ regeneration start step may be repeatedly performed again.

The lambda value equalization step may include measuring the time since the lambda values measured at the first and second lambda sensors were found to be the same, and repeatedly measuring the time since the lambda values measured at the first and second lambda sensors were found to be the same when the measured time is less than the optimum time stored in advance in the control unit.

The lambda value equalization step may include checking whether the time that has elapsed after the lambda values measured at the first and second lambda sensors were found to be the same is greater than or equal to the optimum time, stored in advance in the control unit. Here, the optimum time may be calculated based on data on exhaust flow rates.

The lambda value equalization step may include checking whether the time that has elapsed after the lambda values measured at the first and second lambda sensors were found to be the same is greater than or equal to the optimum time, stored in advance in the control unit. Here, the optimum time may be calculated based on data on the temperature of the LNT.

BRIEF DESCRIPTION OF THE DRAWINGS

The above and other objects, features and other advantages of the present inventive concept will be more clearly understood from the following detailed description taken in conjunction with the accompanying drawings, in which.

DETAILED DESCRIPTION OF THE EMBODIMENTS

Hereinafter, embodiments of the present inventive concept will be described in detail with reference to the accompanying drawings. Prior to the description, it should be understood that the terms used in the specification and appended claims should not be construed as being limited to general and dictionary meanings, but should be interpreted based on the meanings and concepts corresponding to the technical aspects of the present inventive concept on the basis of the principle that the inventor is allowed to define terms appropriately for the best explanation. Therefore, the description given herein is merely a preferable example for the purpose of illustration only, and is not intended to limit the scope of the inventive concept, so it should be understood that various other equivalents and modifications that can replace those at the time of filing this application could be made thereto without departing from the spirit and scope of the inventive concept.

Reference will now be made in detail to the embodiments of the present inventive concept, examples of which are illustrated in the accompanying drawings. Wherever possible, the same reference numbers will be used throughout the drawings to refer to the same or like parts.

Hereinafter, a control method for improving nitrogen oxide purification performance according to embodiments in the present disclosure will be described in detail with reference to the accompanying drawings.

Figure 1:
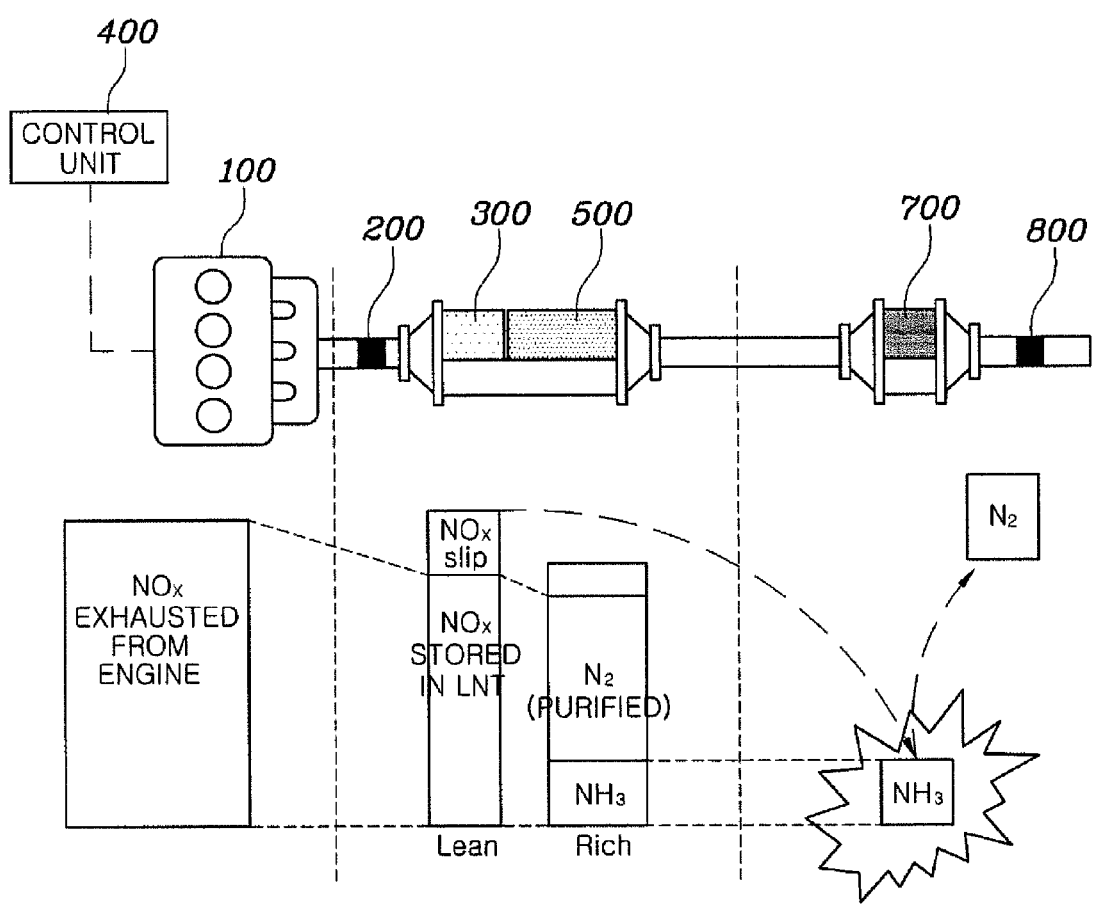
FIG. 1 is a block diagram showing a control method for improving $NO_x$ purification performance according to one embodiment in the present disclosure.
Figure 2:
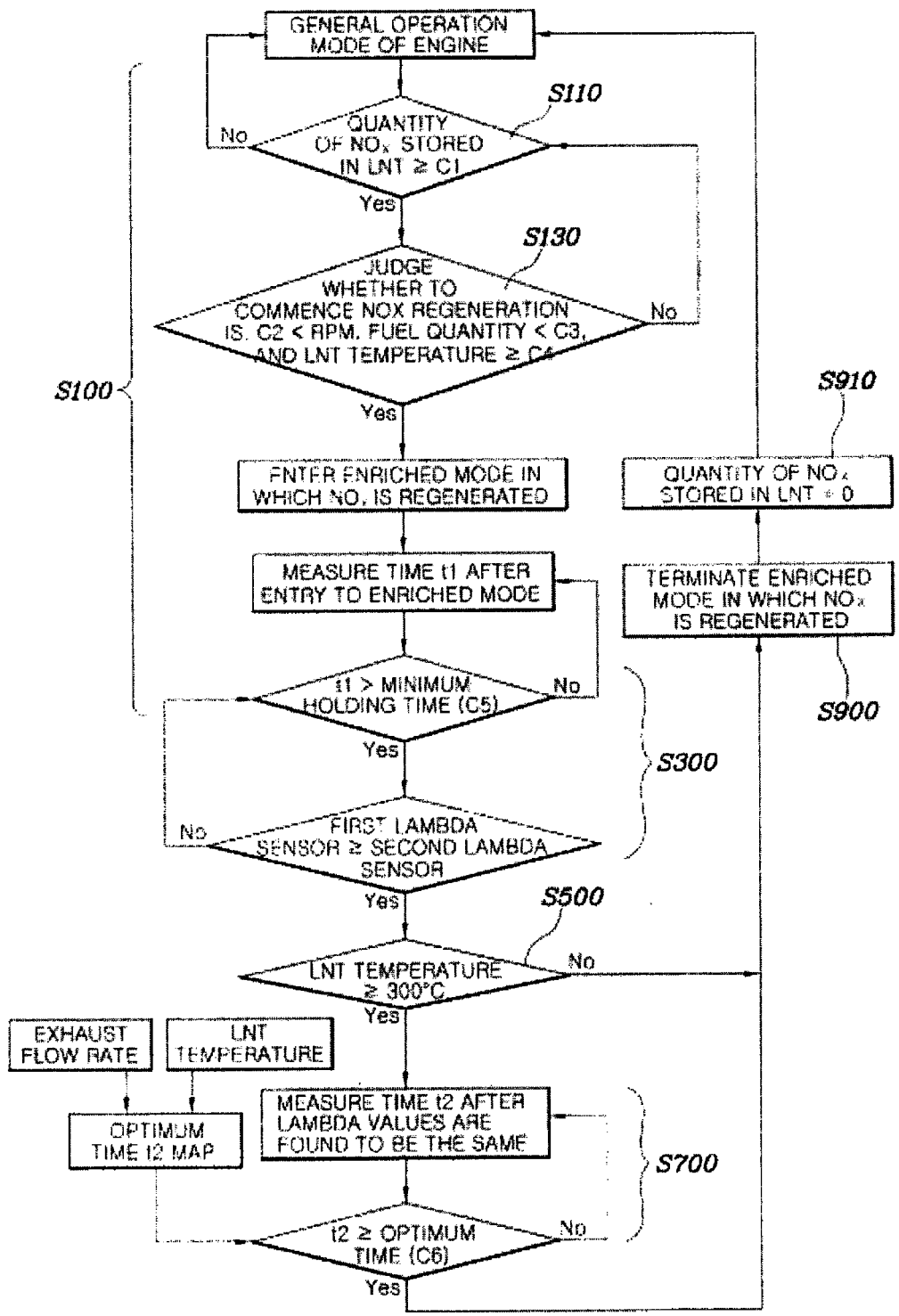
FIG. 2 is a flowchart illustrating the control method for improving $NO_x$ purification performance according to one embodiment in the present disclosure.
Figure 3:
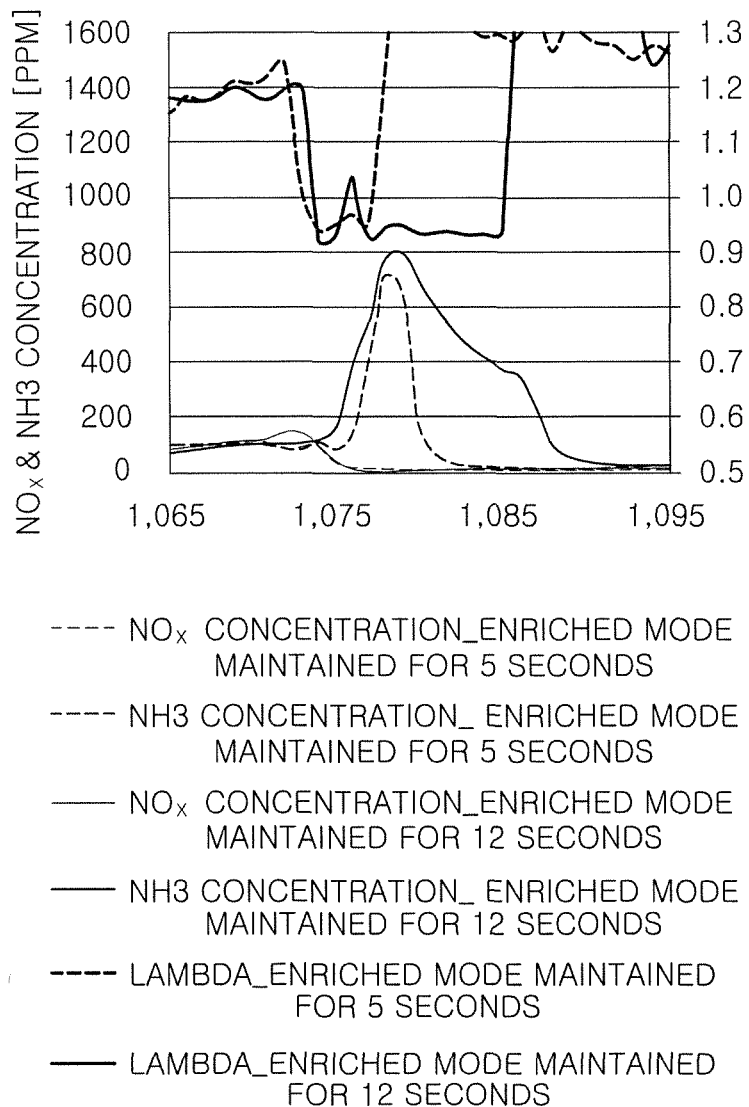
FIGS. 3 and 4 are diagrams showing effects obtained by the control method for improving $NO_x$ purification performance according to one embodiment in the present disclosure.
Figure 4:
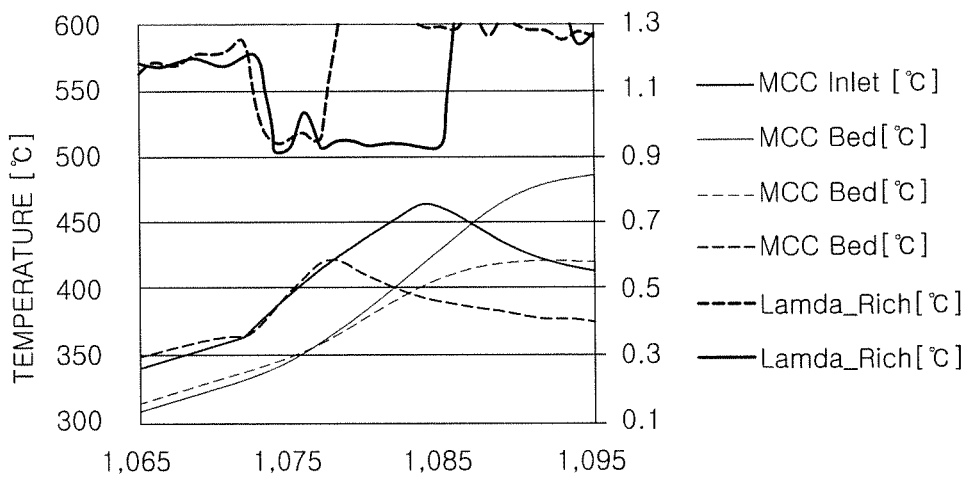

FIG. 1 is a block diagram showing a control method for improving $NO_x$ purification performance according to one embodiment in the present disclosure, FIG. 2 is a flowchart illustrating the control method for improving $NO_x$ purification performance, and FIGS. 3 and 4 are diagrams showing effects obtained by the control method for improving $NO_x$ purification performance. The control method for improving $NO_x$ purification performance according to one embodiment in the present disclosure is used to improve the purification of $NO_x$, which is generally generated upon operation of a diesel engine. In this specification, a diesel engine will be described by way of example, and each of the reference values stored in advance in a control unit 400, as will be described later, may vary to any extent according to the design or circumstances, unless particularly stated otherwise.

As shown in FIG. 1, exhaust gases emitted from an engine 100 are sequentially passed through an LNT 300, a diesel particulate filter (DPF) 500 and a selective catalytic reduction (SCR) unit 700. Here, a first lambda sensor 200 is arranged at the front end of the LNT 300, and a second lambda sensor 800 is provided at the rear end of the SCR unit 700.

The control method for improving $NO_x$ purification performance according to one embodiment in the present disclosure includes introducing $NO_x$ into a regeneration process to regenerate $NO_x$ at a control unit 400. It also includes converting the driving mode to an enriched mode, in which a relative quantity of fuel in an engine 100 is increased, and checking whether the enriched mode has been maintained for a time t1, measured after conversion into the enriched mode, t1 being longer than a minimum holding time C5 ($NO_x$ regeneration start step (S100)). Lambda values measured at first and second lambda sensors 200 and 800 in the control unit 400 are compared when it is observed that the enriched mode has been maintained for a time greater than the minimum holding time C5 after conversion into the enriched mode in the $NO_x$ regeneration start step (S100) (lambda value comparison step (S300)). The temperature of a lean $NO_x$ trap (LNT) 300 is checked for whether it is greater than or equal to a predetermined temperature value, input in advance into the control unit 400, when the lambda value measured at the first lambda sensor 200 is greater than or equal to the lambda value measured at the second lambda sensor 800 in the lambda value comparison step (S300) (LNT temperature checking step (S500)). If the lambda values measured at the first and second lambda sensors 200 and 800 are found to be the same, a time t2 is measured, and the measured time t2 is checked for whether it is greater than or equal to an optimum time S6 stored in advance in the control unit 400 when it is observed that the temperature of the LNT 300 is greater than or equal to the predetermined temperature value in the LNT temperature checking step (S500) (lambda value equalization step (S700)).

When the engine 100 is driven in a general operation mode, an $NO_x$ regeneration start step (S100) of introducing $NO_x$ into a regeneration process to regenerate $NO_x$ at the control unit 400, converting a driving mode into an enriched mode in which a relative quantity of fuel in the engine 100 is increased, and checking whether the enriched mode has been maintained long enough that the time t1 observed to have elapsed after conversion into the enriched mode is greater than a minimum holding time C5 is performed.

Specifically, the $NO_x$ regeneration start step (S100) may include determining whether the engine 100 has been started and whether the quantity of $NO_x$ stored in the LNT 300 is greater than or equal to a reference value C1, stored in advance in the control unit 400 ($NO_x$ storage determination step (S110)).

When the quantity of $NO_x$ stored in the LNT 300 is greater than or equal to the reference value C1, stored in advance in the control unit 400, in the $NO_x$ storage determination step (S110), an $NO_x$ regeneration commencement judgment step (S130) of judging whether to commence $NO_x$ regeneration based on the predetermined references, input in advance into the control unit 400, is performed. The references used in the $NO_x$ regeneration commencement judgment step (S130) may include an engine RPM, a fuel quantity, and a temperature of the LNT 300. An 'AND' operator, used to ensure that all the reference values are met, and an 'OR' operator, used to ensure that at least one of the reference values has been met, may be used herein. This may vary according to the design. The $NO_x$ regeneration commencement judgment step (S130) may include checking whether an engine RPM is within a predetermined reference range, input in advance into the control unit 400 (C2<engine RPM<C3). The $NO_x$ regeneration commencement judgment step (S130) may also include checking whether a fuel quantity is less than a predetermined reference range, input in advance into the control unit 400 (C2'<fuel quantity<C3'). In addition, the $NO_x$ regeneration commencement judgment step (S130) may include checking whether a temperature value of the LNT 300 is greater than or equal to a predetermined reference value C4, input in advance into the control unit 400.

However, when one or more of the above-described conditions are found not to have been met, an $NO_x$ storage determination step (S110), in which whether the quantity of $NO_x$ stored in the LNT 300 is greater than or equal to a reference value C1 stored in advance in the control unit 400 is checked, is repeatedly performed.

Therefore, when the above-described conditions are met, a determination is made to introduce $NO_x$ into a regeneration process to regenerate $NO_x$, and a driving mode is converted from a general driving mode to an enriched mode, in which the quantity of fuel is relatively high for a given amount of air. The $NO_x$ regeneration start step (S100) includes checking whether the enriched mode has been maintained for a time t1, checked at the control unit after conversion to the enriched mode 400, less than or equal to a minimum holding time C5, and repeatedly measuring the time t1 since conversion to the enriched mode when it is observed that the enriched mode has been maintained for a time t1 greater than or equal to the minimum holding time C5.

The $NO_x$ regeneration start step (S100) includes checking whether the enriched mode has been maintained for a time t1, checked at the control unit 400 after conversion into the enriched mode, less than or equal to the minimum holding time C5, and comparing the lambda values measured at the first and second lambda sensors 200 and 800 in the control unit 400 when it is observed that the enriched mode has been maintained for a time t1 greater than or equal to the minimum holding time C5 (lambda value comparison step (S300)).

The lambda value comparison step (S300) includes repeatedly checking whether the enriched mode has been maintained long enough that the time t1 since conversion into the enriched mode is greater than the minimum holding time C5 when the lambda value measured at the first lambda sensor 200 is less than the lambda value measured at the second lambda sensor 800.

When the lambda value measured at the first lambda sensor 200 is greater than or equal to the lambda value measured at the second lambda sensor 800, an LNT temperature checking step (S500) of checking whether the temperature of the LNT 300 is greater than or equal to a predetermined temperature value, is performed. For example, based on a reference temperature of 300° C., in which it is judged whether the temperature of the LNT 300 is greater than or equal to 300° C., is illustrated in FIG. 2 of the present specification. However, the reference temperature may vary to any extent according to the design or circumstances.

Therefore, the LNT temperature checking step (S500) includes terminating the enriched mode, in which $NO_x$ is regenerated, when it is observed that the temperature of the LNT 300 is less than the predetermined temperature value (termination step (S900)).

However, when it is observed that the temperature of the LNT 300 is greater than or equal to a predetermined temperature value (300° C.) in the LNT temperature checking step (S500), a lambda value equalization step (S700) of checking the time t2 that has elapsed after the lambda values, measured at the first and second lambda sensors 200 and 800, were found to be the same, and checking whether the measured time t2 is greater than or equal to an optimum time C6, stored in advance in the control unit 400.

The lambda value equalization step (S700) includes checking the amount of time t2 that has elapsed after the lambda values measured at the first and second lambda sensors 200 and 800 were found to be the same, and terminating the enriched mode, in which $NO_x$ is regenerated when the measured time t2 is greater than or equal to the optimum time C6, stored in advance in the control unit 400 (termination step (S900)). The lambda value equalization step (S700) includes checking the amount of time t2 that has elapsed after the lambda values were found to be the same, and repeatedly measuring the amount of time t2 that has elapsed after the lambda values were found to be the same when the measured time t2 is less than the optimum time C6 stored in advance in the control unit 400.

In particular, the lambda value equalization step (S700) includes checking whether the amount of time t2 that has elapsed after the lambda values measured at the first and second lambda sensors 200 and 800 were found to be the same is greater than or equal to the optimum time C6 stored in advance in the control unit 400. The optimum time may be calculated using a map stored in the control unit 400, based on data on exhaust flow rates and temperatures of the LNT 300, and may be applied using an algorithm.

The termination step (S900) may further include terminating the enriched mode, in which $NO_x$ is regenerated at the control unit 400, and setting the quantity of $NO_x$ stored in the LNT 300 to '0' (resetting step (S910)), and the $NO_x$ regeneration start step (S100) may be repeatedly performed again.

The present disclosure provides a control algorithm capable of increasing the quantity of $NH_3$ that is generated, compared to conventional control algorithms, in which the enriched mode, in which $NO_x$ is regenerated, is terminated at the point of time at which the lambda values measured at the first and second lambda sensors 200 and 800, mounted respectively at the rear and front ends of the LNT 300, are found to be the same. That is, after conversion into the enriched mode, the generation of $NH_3$ may be activated when the lambda value is less than or equal to 0.98 and the temperature of the LNT 300 is greater than or equal to 300° C.

Therefore, the present disclosure is designed to improve $NO_x$ purification performance in the LNT 300 and the pSCR unit 700 by finding the lambda values to be the same the lambda values being measured at the first and second lambda sensors 200 and 800 upon conversion into the enriched mode, in which $NO_x$ is regenerated at 300° C. or higher, at which temperature the generation of $NH_3$ is activated, and further extending the duration of the enriched mode to convert residual $NO_x$ into $NH_3$. The time for which the enriched mode is extended further is set as an optimum time chosen by preliminary evaluation according to the engine exhaust flow rates and temperature of the LNT 300.

Accordingly, the control method for improving $NO_x$ purification performance according to the embodiments in the disclosure thus configured can be useful in increasing the quantity of $NH_3$ that is generated using the control technique for enhancing $NH_3$ generation shown in FIGS. 3 and 4. Therefore, the control method has an advantage in that oxygen emitted from an oxygen storage capacity (OSC) material is completely consumed as the temperature of exhaust gases increases over time after conversion to the enriched mode, resulting in increased selectivity with which $NO_x$ is converted into $NH_3$.

According to the control method for improving $NO_x$ purification performance thus configured, there is provided a control algorithm capable of enhancing the quantity of $NH_3$ that is generated, compared to conventional control algorithms, in which the enriched mode, in which $NO_x$ is regenerated, is terminated at the point of time at which the lambda values, measured at the first and second lambda sensors mounted respectively at the rear and front ends of the LNT 300, are observed to be the same. That is, after conversion into the enriched mode, the generation of $NH_3$ may be activated when the lambda value is less than or equal to 0.98 and the temperature of the LNT 300 is greater than or equal to 300° C.

Therefore, the present disclosure is designed to improve $NO_x$ purification performance in the LNT and the pSCR unit by finding the lambda values to be the same, the lambda values being measured at the first and second lambda sensors upon conversion to the enriched mode, in which $NO_x$ is regenerated at 300° C. or higher, at which temperature $NH_3$ generation is activated, and further extending the duration of the enriched mode to convert residual $NO_x$ into $NH_3$. Moreover, the time for which the enriched mode is extended further is set as an optimum time, chosen by preliminary evaluation according to the engine exhaust flow rates and temperature of the LNT 300.

Accordingly, the control method for improving $NO_x$ purification performance according to the embodiments in the disclosure thus configured can be useful in enhancing the quantity of $NH_3$ that is generated using the control technique for enhancing $NH_3$ generation shown in FIGS. 3 and 4. Therefore, the control method has an advantage in that oxygen emitted from an OSC material is completely consumed as the temperature of exhaust gases increases with time after conversion to the enriched mode, resulting in increased selectivity with which $NO_x$ is converted into $NH_3$.

Although the embodiments presented herein have been disclosed for illustrative purposes, those skilled in the art will appreciate that various modifications, additions and substitutions are possible, without departing from the scope and spirit of the inventive concept as disclosed in the accompanying claims.

What is claimed is:

1. A control method for improving nitrogen oxide purification performance ($NO_x$), comprising steps of:
   starting a $NO_x$ regeneration process via a control unit by converting from a general driving mode to an enriched mode, in which a relative quantity of fuel in an engine is increased, and checking whether the enriched mode is maintained for a first time greater than a minimum holding time;
   comparing a first lambda value measured at a first lambda sensor, arranged upstream from a lean $NO_x$ trap (LNT), with a second lambda value measured at a second lambda sensor, arranged downstream from the LNT, via the control unit when the enriched mode is maintained for the first time greater than the minimum holding time;

checking whether a temperature of the LNT is greater than or equal to a predetermined temperature value when the first lambda value is greater than or equal to the second lambda value; and measuring a second time that has elapsed after the first and second lambda values are found to be the same, and checking whether the second time is greater than or equal to a predetermined time when it is observed that the temperature of the LNT is greater than or equal to the predetermined temperature value.

2. The method according to claim 1, wherein the step of starting $NO_x$ regeneration further comprises determining whether the engine is started and whether a quantity of $NO_x$ stored in the LNT is greater than or equal to a reference value stored in advance in the control unit.

3. The method according to claim 1, wherein the step of starting $NO_x$ regeneration further comprises a step of judging whether $NO_x$ regeneration should commence based on predetermined references input in advance into the control unit.

4. The method according to claim 3, wherein the step of judging whether $NO_x$ regeneration should commence further comprises checking whether an engine RPM is within a predetermined reference range input in advance into the control unit.

5. The method according to claim 3, wherein the step of judging whether $NO_x$ regeneration should commence further comprises checking whether a fuel quantity is within a predetermined reference range input in advance into the control unit.

6. The method according to claim 3, wherein the step of judging whether $NO_x$ regeneration should commence comprises checking whether a temperature value of the LNT is greater than or equal to a predetermined reference value input in advance into the control unit.

7. The method according to claim 1, wherein the step of comparing the lambda values comprises repeatedly checking whether the enriched mode is maintained for the first time when the first lambda value is less than the second lambda value.

8. The method according to claim 1, wherein the step of checking the LNT temperature further comprises a step of terminating the enriched mode in which $NO_x$ is regenerated when it is observed that the temperature of the LNT is less than the predetermined temperature value.

9. The method according to claim 8, wherein the step of terminating the enriched mode further comprises setting a quantity of $NO_x$ stored in the LNT to 0, and repeatedly performing the $NO_x$ regeneration start step.

10. The method according to claim 1, further comprising a step of terminating the enriched mode when the second time is greater than or equal to the predetermined time.

11. The method according to claim 10, wherein the step of terminating the enriched mode further comprises setting a quantity of $NO_x$ stored in the LNT to 0, and repeatedly performing the NO regeneration start step.

12. The method according to claim 10, wherein the predetermined time is calculated based on data on exhaust flow rates.

13. The method according to claim 10, wherein the predetermined time is calculated based on data on the temperature of the LNT.

* * * * *